(12) United States Patent
Uemoto

(10) Patent No.: US 7,687,564 B2
(45) Date of Patent: Mar. 30, 2010

(54) BLACK IRON-BASED PARTICLES, AND BLACK PAINT AND RUBBER OR RESIN COMPOSITION USING THE SAME

(75) Inventor: Shinji Uemoto, Hiroshima (JP)

(73) Assignee: Toda Kogyo Corporation, Hiroshima-shi, Hiroshima-ken (JP)

( * ) Notice: Subject to any disclaimer, the term of this patent is extended or adjusted under 35 U.S.C. 154(b) by 0 days.

(21) Appl. No.: 11/433,773

(22) Filed: May 15, 2006

(65) Prior Publication Data

US 2006/0264551 A1    Nov. 23, 2006

(30) Foreign Application Priority Data

May 23, 2005   (JP) .............................. 2005-148840

(51) Int. Cl.
*B60C 1/00*   (2006.01)
*C08K 3/04*   (2006.01)
*C08K 3/22*   (2006.01)

(52) U.S. Cl. ........................ 524/492; 524/495; 524/497

(58) Field of Classification Search ................. 524/492, 524/495, 497
See application file for complete search history.

(56) References Cited

U.S. PATENT DOCUMENTS 6,129,784 A * 10/2000 Ikuta et al. .................. 106/417

2004/0131852 A1   7/2004   Shimo et al.
2005/0048387 A1   3/2005   Nakata et al.

FOREIGN PATENT DOCUMENTS

| EP | 0 402 026 A | 12/1990 |
|---|---|---|
| EP | 1 413 607 A | 4/2004 |
| EP | 1 510 502 A | 3/2005 |
| JP | 10 279314 A | 10/1998 |
| JP | 2003 345067 A | 12/2003 |
| JP | 2004 161608 A | 6/2004 |

* cited by examiner

*Primary Examiner*—William K Cheung
(74) *Attorney, Agent, or Firm*—Nixon & Vanderhye P.C.

(57) ABSTRACT

There are provided black iron-based particles comprising iron/titanium composite oxide particles having a titanium element content (A) of 5 to 35% by atom based on an iron element content contained in the black iron-based particles, and a ratio of a titanium element content (B) (based on an iron element content contained in the portion dissolved) in a portion of the black iron-based particles, which is dissolved therefrom at an iron element dissolution percentage of 1% by weight, to the titanium content (A) of not less than 1.0. The black iron-based particles of the present invention are not only excellent in dispersibility, acid resistance, tinting strength and blackness, but also exhibit a less magnetization value. Also, the black paint and the rubber or resin composition of the present invention are excellent in acid resistance and blackness.

11 Claims, No Drawings ular, thereby the resultant particles having dispersibility, acid resistance, blackness, tinting strength and magnetization value are still unsatisfactory.

BLACK IRON-BASED PARTICLES, AND BLACK PAINT AND RUBBER OR RESIN COMPOSITION USING THE SAME

BACKGROUND OF THE INVENTION

The present invention relates to black iron-based particles, and a black paint and a rubber or resin composition using the black iron-based particles, and more particularly, to black iron-based particles which are excellent in dispersibility, blackness, tinting strength and acid resistance and exhibit a less magnetization value, and a black paint and a rubber or resin composition using such black iron-based particles.

As typical black pigments, there are known magnetite particles, carbon black, graphite fluoride or the like. These black pigments have been generally used as colorants for paints, printing inks, cosmetics, rubber and resin compositions or the like for a long time.

In recent years, from the standpoints of good safety and hygiene, high working efficiency capable of meeting current energy saving requirements, and enhancement in various properties, it has been strongly required to provide black pigment particles having a good workability and various excellent properties which are safe and harmless, and excellent in not only blackness and tinting strength but also dispersibility.

However, the magnetite particles tend to be re-agglomerated together due to high magnetic properties thereof despite safety and harmlessness, resulting in difficult dispersion and poor workability.

Also, the carbon black is in the form of ultrafine and bulky particles having a particle diameter of about 0.01 to 0.1 μm, and therefore, tends to be deteriorated in handling property and workability. Further, it has been reported that the carbon black has problems concerning safety and hygiene, such as carcinogenesis.

The graphite fluoride is not a safe and harmless substance, and tends to exhibit an insufficient dispersibility.

On the other hand, there have been proposed Mn-containing hematite particles which are safe and harmless, and usable as a non-magnetic black pigment (Japanese Patent Application Laid-open (KOKAI) No. 10-279314 (1998)). However, it has been recently reported that the Mn-containing compounds have problems concerning safety, such as adverse influences on human lung and nervous system.

Therefore, at present, it has been strongly required to provide a black pigment which is hardly magnetically agglomerated together, has good safety and harmlessness, and exhibits an excellent blackness.

In order to improve the workability, the pigment is required to have a non-magnetic property, an appropriate particle size, an excellent dispersibility and a good handling property.

The good dispersibility of the pigment contributes to not only enhancement in clearness of color tone and basic properties inherent to the pigment such as tinting strength and hiding power, but also enhancement in gloss and clarity of the resultant coating film as well as film properties thereof such as acid resistance.

On the other hand, in recent years, natural and life environmental problems such as acid rain have been become more worse. In particular, film-forming materials and rubber or resin compositions used outdoors have been more strongly required to exhibit a high acid resistance.

Conventionally, there are known the black pigment composed of a mixture of $Fe_2TiO_5$ and a $Fe_2O_3$—$FeTiO_3$ solid solution (Japanese Patent Application Laid-open (KOKAI) No. 3-2276 (1991)); the black pigment having a particle structure in which a rutile-type $TiO_2$ phase as a base substance is coated with a $Fe_2TiO_4$ phase (Japanese Patent Application Laid-open (KOKAI) No. 2002-129063); the black iron-based particles composed of a mixture of a $Fe_2O_3$—$FeTiO_3$ solid solution or a $Fe_2O_3$—$FeTiO_3$ solid solution, and an iron-based oxide having a spinel type structure (Japanese Patent Application Laid-open (KOKAI) No. 2004-161608); or the like.

Thus, at present, it has been most strongly required to provide a black pigment which is not only excellent in dispersibility, acid resistance, tinting strength and blackness, but also exhibits a less magnetization value. However, the black pigment having such properties has not been obtained until now.

This is, although the non-magnetic particles described in Japanese Patent Application Laid-open (KOKAI) No. 3-2276 (1991) are iron and titanium composite oxide particles, the ratio between contents of iron and titanium in the vicinity of the surface of the respective particles is not taken into consideration. As a result, the obtained particles may fail to satisfy the dispersibility, acid resistance, blackness and tinting strength as required.

The black composite oxide described in Japanese Patent Application Laid-open (KOKAI) No. 2002-129063 which has a particle structure in which a rutile-type $TiO_2$ phase as a base substance is coated with a $Fe_2TiO_4$ phase, may also fail to fully satisfy the dispersibility, acid resistance, blackness and tinting strength as required.

Although the black iron-based particles described in Japanese Patent Application Laid-open (KOKAI) No. 2004-161608 are iron and titanium composite oxide particles, the ratio between contents of iron and titanium in the vicinity of the surface of the respective particles is not taken into consideration. As a result, the obtained particles may fail to satisfy the dispersibility, acid resistance, blackness and tinting strength as required.

As a result of the present inventors' earnest study for solving the above problems, it has been found that by controlling a titanium element content (A) in iron/titanium composite oxide particles constituting the black iron-based particles to 5 to 35% by atom based on an iron element content and controlling a ratio of a titanium element content (B) (based on an iron element content contained in the portion dissolved) in a portion of the iron/titanium composite oxide particles constituting the black iron-based particles, which is dissolved therefrom until reaching an iron element dissolution percentage of 1% by weight to the above titanium element content (A), to not less than 1.0, the resultant black iron-based particles are surprisingly not only excellent in dispersibility, acid resistance, blackness and tinting strength, but also exhibit a less magnetization value. The present invention has been attained based on the above finding.

SUMMARY OF THE INVENTION

An object of the present invention is to provide black iron-based particles which are not only excellent in dispersibility, acid resistance, blackness and tinting strength, but also exhibit a less magnetization value.

Another object of the present invention is to provide a black paint and a rubber or resin composition, which are excellent in acid resistance and blackness.

To accomplish the aims, in a first aspect of the present invention, there is provided black iron-based particles comprising iron/titanium composite oxide particles and having a titanium element content (A) of 5 to 35% by atom based on an iron element content contained in the black iron-based particles, and a ratio of a titanium element content (B) (based on an iron element content contained in the portion dissolved) in a portion of the black iron-based particles, which is dissolved therefrom at an iron element dissolution percentage of 1% by weight, to the titanium content (A) of not less than 1.0.

In a second aspect of the present invention, there is provided a black paint comprising a paint base material and the black iron-based particles as defined in the above first aspect which are blended in the paint base material.

In a third aspect of the present invention, there is provided a rubber or resin composition comprising a rubber or resin composition base material and the black iron-based particles as defined in the above first aspect which are blended in the rubber or resin composition base material.

DETAILED DESCRIPTION OF THE INVENTION

The present invention is described in detail below.

First, there are described the black iron-based particles of the present invention which comprise iron/titanium composite oxide particles and have a titanium element content (A) of 5 to 35% by atom based on an iron element content contained in the black iron-based particles, and a ratio of a titanium element content (B) (based on an iron element content contained in the portion dissolved) in a portion of the black iron-based particles, which is dissolved therefrom at an iron element dissolution percentage of 1% by weight, to the titanium content (A) of not less than 1.0.

The titanium element content (A) in the black iron-based particles of the present invention is 5 to 35% by atom and preferably 10 to 33.3% by atom based on an iron element content contained therein. When the titanium element content (A) is less than 5% by atom, the resultant particles tend to be deteriorated in acid resistance, so that it may be difficult to obtain particles having a high blackness and a less magnetization value. When the titanium element content (A) is more than 35% by atom, the resultant particles tend to be deteriorated in dispersibility, blackness and tinting strength.

The black iron-based particles of the present invention may contain, in addition to the iron and titanium elements, at least one element selected from the group consisting of Mg, Al, Si, P, Mn, Co, Ni, Cu and Zn in an amount of 0 to 10% by atom based on a total amount of the iron and titanium elements contained therein.

The black iron-based particles of the present invention have a phase structure constituted from a $FeTiO_3$—$Fe_2O_3$ solid solution, $Fe_2TiO_5$, a $Fe_2TiO_4$—$Fe_3O_4$ solid solution, $FeTiO_3$ or $Fe_2TiO_4$. The black iron-based particles may also have a phase structure comprising a mixture of any two or more of the above-mentioned compounds. Among of them, preferred is a phase structure comprising at least a $FeTiO_3$—$Fe_2O_3$ solid solution. Further, the black iron-based particles may contain $Fe_3O_4$ or spinel iron oxides such as $\gamma$-$Fe_2O_3$ as a raw material thereof.

In the black iron-based particles of the present invention, the ratio of the titanium element content (B) (based on an iron element content contained in the portion dissolved) in a portion of the black iron-based particles, which is dissolved therefrom at an iron element dissolution percentage of 1% by weight, to the titanium content (A), is not less than 1.0, preferably not less than 1.2, more preferably not less than 1.3. When the ratio (B/A) is less than 1.0, the resultant particles tend to be deteriorated in dispersibility, acid resistance, blackness and tinting strength. Meanwhile, the upper limit of the ratio (B/A) is usually about 1.8.

The black iron-based particles of the present invention have a BET specific surface area value of usually 3 to 60 $m^2/g$, preferably 4 to 30 $m^2/g$, more preferably 5 to 20 $m^2/g$ as measured by a nitrogen absorption method. When the BET specific surface area value is less than 3 $m^2/g$, the resultant black iron-based particles tend to become coarse, or sintering tends to be caused within or between the particles, so that the resultant particles also tend to become coarse, and therefore, tend to be deteriorated in tinting strength. When the BET specific surface area value is more than 60 $m^2/g$, the obtained particles may fail to exhibit a good blackness as required.

The black iron-based particles of the present invention have a saturation magnetization value of usually less than 40 $Am^2/kg$, preferably not more than 30 $Am^2/kg$. When the saturation magnetization value is not less than 40 $Am^2/kg$, the particles tend to be re-agglomerated with each other, resulting in difficult dispersion thereof.

As to the hue of the black iron-based particles of the present invention, the blackness L* value thereof is usually 6 to 12.5, preferably 6 to 11. When the blackness L* value is more than 12.5, the resultant particles may fail to exhibit an excellent blackness. On the other hand, it may be difficult to industrially produce such black iron-based particles having a blackness L* value of less than 6. Also, the black iron-based particles of the present invention usually have an a* value of usually −2 to 4 and a b* value of usually −2 to 4.

The tinting strength of the black iron-based particles of the present invention is usually 35 to 44, preferably 35 to 43 as measured by the below-mentioned evaluation method. When the tinting strength is more than 44, the black iron-based particles used as a non-magnetic black pigment may fail to exhibit a sufficient blackness. On the other hand, it may be difficult to industrially produce such black iron-based particles having a tinting strength of less than 35.

Next, the process for producing the black iron-based particles according to the present invention is described.

The black iron-based particles according to the present invention may be produced by coating the surface of magnetite particles with a titanium compound; adjusting a pH value of a water suspension containing the magnetite particles coated with the titanium compound to usually 5.0 to 7.5; aging the water suspension containing the particles at a temperature of usually not less than 70° C. for usually not less than 1 hour; heat-calcining the resultant particles at a temperature of usually 600 to 850° C. in a non-oxidative atmosphere; and then pulverizing the thus calcined particles.

The magnetite particles may be produced, for example, by passing an oxygen-containing gas through a ferrous salt reaction solution containing a ferrous hydroxide colloid obtained by reacting an aqueous ferrous salt solution with an aqueous alkali solution.

Examples of the titanium compound usable in the present invention may include titanyl sulfate, titanium tetrachloride and titanium trichloride.

The coating of the magnetite particles with the titanium compound may be conducted by the following method. That is, the titanium compound is added to a water suspension containing the magnetite particles, and to the resultant suspension, an aqueous alkali hydroxide solution or an aqueous alkali carbonate solution is added to coat the surface of the magnetite particles with the titanium compound. Meanwhile, in the reaction for the above coating treatment, the pH value of the reaction solution immediately after adding the titanium compound thereto is preferably maintained through the reaction without decrease thereof.

The amount of the titanium compound added is usually 5 to 35% by atom and preferably 10 to 33.3% by atom (calculated as a titanium element) based on an iron element content contained therein. When the amount of the titanium compound added is less than 5% by atom, the resultant particles tend to be deteriorated in acid resistance, so that it may be difficult to obtain black iron-based particles having a high blackness and a low magnetization value. When the amount of the titanium compound added is more than 35% by atom, the resultant particles tend to be deteriorated in dispersibility, blackness and tinting strength.

In the present invention, the pH value of the water suspension containing the magnetite particles coated with the titanium compound is adjusted to usually 5.0 to 7.5, preferably 5.5 to 7.3, and the resultant suspension is aged at a temperature of usually not less than 70° C. for usually not less than 1 hour. When the suspension is aged for not less than 1 hour, the magnetite particles can be more uniformly coated with the titanium compound. The upper limit of the aging temperature is usually about 105° C., and the upper limit of the aging time is usually 2 hours. Even though the aging is conducted for more than 2 hours, no further effect is obtainable.

Meanwhile, in the case where the above different kinds of metal elements are to be incorporated into the black iron-based particles, these metal elements may be previously contained in the magnetite particles, or salts of these metal element compounds or a solution containing these metal elements may be added to an aqueous solution containing the magnetite particles whose surface is coated with the titanium compound.

In the present invention, the heat-calcining treatment is preferably conducted under a non-oxidative atmosphere. If the heat-calcining treatment is conducted under an oxidative atmosphere, it may be difficult to obtain black iron-based particles having a high blackness.

The heat-calcining temperature used in the present invention is usually 600 to 850° C., preferably 620 to 830° C. When the heat-calcining temperature is less than 600° C., the solid phase reaction between the magnetite particles and the titanium compound tends to be insufficient, so that it may be difficult to obtained the aimed black iron-based particles. When the heat-calcining temperature is more than 850° C., an undesirable phase tends to be disadvantageously produced.

The thus heat-calcined particles may be pulverized by an ordinary method.

Next, the paint of the present invention is described.

A coating film obtained from the black paint of the present invention exhibits an $L^*$ value of usually 6 to 12.5, an $a^*$ value of usually $-2$ to 4 and a $b^*$ value of usually $-2$ to 4, which are substantially identical to those of conventionally known black pigment particles. Also, the coating film obtained from the black paint of the present invention exhibits a gloss of usually not less than 80%, preferably not less than 83%; an acid resistance $\Delta G$ value of usually not more than 8.0, preferably not more than 7; and a $\Delta L^*$ value of usually not more than 1.0, preferably not more than 0.8. In the consideration of a good hue of the coating film, the $L^*$ value thereof is preferably 6 to 11; the $a^*$ value thereof is preferably $-2$ to 3; and the $b^*$ value thereof is preferably $-2$ to 3.

Next, the process for producing the paint according to the present invention is described.

The content of the black iron-based particles used in the paint of the present invention is usually 0.1 to 200 parts by weight based on 100 parts by weight of a paint base material. In the consideration of a good handling property of the paint, the content of the black iron-based particles is preferably 0.1 to 100 parts by weight, more preferably 0.1 to 50 parts by weight.

The paint base material used in the present invention may contain a resin and a solvent, if required, together with an extender pigment, a drying accelerator, a surfactant, a curing accelerator, an assistant, etc.

As the resin, there may be used those resins ordinarily used for solvent-based paints, such as acrylic resins, alkyd resins, polyester resins, polyurethane resins, epoxy resins, phenol resins, melamine resins and amino resins, as well as those resins ordinarily used for water-based paints, such as water-soluble alkyd resins, water-soluble melamine resins, water-soluble acrylic resins and water-soluble urethane emulsion resins.

As the solvent, there may be used those solvents ordinarily used for solvent-based paints such as toluene, xylene, butyl acetate, methyl acetate, methyl isobutyl ketone, butyl cellosolve, ethyl cellosolve, butyl alcohol and aliphatic hydrocarbons.

As the solvents for water-based paints, there may be used a mixture of water or water with a solvent ordinarily used for water-based paints such as butyl cellosolve and butyl alcohol.

As the defoamer, there may be used commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" (all produced by SUN NOPCO CO., LTD.), "ANTI-FOAM 08 (tradename)" and "EMULGEN 903 (tradename)" (both produced by KAO CO., LTD.), or the like.

Next, the rubber or resin composition of the present invention is described.

The black rubber or resin composition of the present invention exhibits an $L^*$ value of usually 6 to 12.5, an $a^*$ value of usually $-2$ to 4 and a $b^*$ value of usually $-2$ to 4 which are substantially identical to those of conventionally known black pigment particles. Also, the rubber or resin composition exhibits a dispersibility of usually Rank 4 or 5 when visually observed and evaluated by the below-mentioned method. In the consideration of a good hue of the rubber or resin composition, the $L^*$ value thereof is preferably 6 to 11; the $a^*$ value thereof is preferably $-2$ to 3; and the $b^*$ value thereof is preferably $-2$ to 3.

Next, the process for producing the rubber or resin composition according to the present invention is described.

The content of the black iron-based particles used in the rubber or resin composition of the present invention is usually 0.01 to 200 parts by weight based on 100 parts by weight of a rubber or resin composition base material. In the consideration of a good handling property of the rubber or resin composition, the content of the black iron-based particles is preferably 0.05 to 100 parts by weight, more preferably 0.1 to 50 parts by weight.

The rubber or resin composition base material used in the present invention may contain the black iron-based particles and a rubber or a known thermoplastic resin, if required, together with various additives such as a lubricant, a plasticizer, an antioxidant, an ultraviolet absorber and various stabilizers.

The amount of these additives added may be usually not more than 50% by weight based on the total weight of the black iron-based particles and the rubber or thermoplastic resin. When the amount of the additives added is more than 50% by weight, the resultant composition tends to be deteriorated in moldability.

The rubber or resin composition of the present invention may be produced by previously intimately mixing a raw rubber or resin material with the black iron-based particles, and then applying a strong shear force to the resultant mixture under heating using a kneader or an extruder to deaggregate the agglomerated black pigment particles, thereby allowing the black iron-based particles to be uniformly dispersed in the rubber or resin. The thus produced rubber or resin composition may be molded into a desired shape according to the aimed objects.

In accordance with the present invention, it has been found that the ratio of the titanium element content (B) (based on an iron element content contained in the portion dissolved) in a portion of the black iron-based particles, which is dissolved therefrom at an iron element dissolution percentage of 1% by weight, to the titanium content (A), has a close correlation with the dispersibility, acid resistance, blackness, tinting strength and magnetization value of the black iron-based particles.

The reason why the black iron-based particles of the present invention are not only excellent in blackness and tinting strength but also can exhibit a less magnetization value is considered by the present inventors to be that the magnetite particles are more uniformly coated with the titanium compound, so that the coating efficiency can be increased, and the reaction between the magnetite particles and the titanium compound can proceed more effectively, resulting in remarkably decreased content of unreacted residual titanium oxide in the black iron-based particles.

Also, the reason why the black iron-based particles of the present invention are excellent in dispersibility and acid resistance is considered by the present inventors to be that a large amount of a titanium element is locally present in the vicinity of the surface of the respective black iron-based particles, and the amount of the residual titanium oxide present in the black iron-based particles is remarkably decreased.

The black iron-based particles of the present invention are excellent in blackness and can exhibit a less magnetization value, and are further excellent in dispersibility and acid resistance, and therefore, can be suitably used as a black pigment.

The black iron-based particles of the present invention are not only excellent in dispersibility, acid resistance and blackness, but also can exhibit a less magnetization value, and therefore, can be suitably used in a black paint and a rubber or resin composition.

The black paint and the rubber or resin composition which are tinted with the black iron-based particles of the present invention are excellent in blackness and acid resistance, and therefore, can be suitably used as a black paint and a rubber or resin composition.

EXAMPLES

The present invention is described in more detail by Examples. However, the Examples are only illustrative and not intended to limit the scope of the present invention.

Various properties were evaluated by the following methods.

(1) The titanium element content (A) based on an iron element content contained in the black iron-based particles was calculated from an iron element content and a titanium element content in the black iron-based particles which were respectively measured by a fluorescent X-ray analyzing apparatus "RIX-2100 Model" (manufactured by RIGAKU DENKI KOGYO CO., LTD.) according to JIS K0119 "General rule of fluorescent X-ray analysis".

(2) The ratio of a titanium element content (B) (based on an iron element content contained in the portion dissolved) in a portion of the black iron-based particles, which was dissolved therefrom at an iron element dissolution percentage of 1% by weight, to the titanium content (A) based on an iron element content contained in the black iron-based particles, was calculated from the titanium element content (A) obtained by the above method, and the titanium element content (B) obtained by the following method.

The titanium element content (B) (based on an iron element content contained in the portion dissolved) in a portion of the black iron-based particles, which was dissolved therefrom at an iron element dissolution percentage of 1% by weight, may be measured, for example, by the following method.

That is, 10 g of the black iron-based particles were accurately weighed, and then intimately mixed with an appropriate amount of ion-exchanged water to prepare a slurry. The thus obtained slurry was further mixed with ion-exchanged water to adjust a total amount of the slurry to 1850 mL.

Next, while maintaining the slurry at a temperature of 40° C. and stirring the slurry at a constant stirring speed of 200 rpm, 150 mL of a guaranteed hydrochloric acid was added to the slurry to initiate dissolution of the black iron-based particles therein. At this time, the concentrations of the black iron-based particles and the hydrochloric acid in the slurry were 5 g/L and about 1 N, respectively.

The resultant suspension containing the black iron-based particles was sampled in an amount of 20 mL for each at optional intervals of from 1 to 10 min to obtain an optional number of samples, and then each sample was filtered through a 0.1 μm-mesh membrane filter to obtain a filtrate.

10 mL of the thus obtained filtrate was subjected to elemental analysis using an inductively coupled high-frequency plasma atomic emission spectroscopic meter "SPS-4000 Model" manufactured by Seiko Denshi Kogyo Co., Ltd., thereby determining an iron element content and a titanium element content thereof.

Meanwhile, the iron element dissolution percentage of the black iron-based particles was calculated according to the following formula:

Iron Element Dissolution Percentage (%)={(Amount of iron element dissolved (g))/Total amount of iron element content contained in the black iron-based particles (g)}×100

The amount of the iron element dissolved was calculated from the iron element content in the above filtrate, and the total amount of the iron element content contained in the black iron-based particles was calculated from the iron element content in the black iron-based particles which was measured by the above fluorescent X-ray analysis.

The titanium element content (B) (% by atom) (based on an iron element content contained in the portion dissolved) in a portion of the black iron-based particles, which is dissolved therefrom at an iron element dissolution percentage of 1% by weight, was determined by plotting the titanium element contents relative to the respective iron element dissolution percentages calculated from the above formula.

Meanwhile, depending upon a solubility of the black iron-based particles in an acid, a concentration of the acid used for dissolving the particles may be appropriately controlled so as to permit the plotting before and after the point where the iron element dissolution percentage is 1% by weight.

(3) The specific surface area value of the respective particles was expressed by the value measured by a $N_2$-absorption BET method using "Mono Sorb MS-11" manufactured by Yuasa Ionics Co., Ltd.

(4) The phase structure of the particles was identified using an X-ray diffractometer "RINT-2500" (manufactured by Rigaku Denki Kogyo Co., Ltd.; tube: Cu).

(5) The magnetic properties of the black iron-based particles were expressed by the values measured using a vibration sample type magnetometer "VSM-3S-15" manufactured by Toei Kogyo Co., Ltd., by applying a magnetic field of 796 kA/m (10 kOe) thereto.

(6) The hue of the black iron-based particles was measured by the following method. That is, 0.5 g of a sample and 0.5 ml of a castor oil were intimately kneaded together by a Hoover's muller to form a paste. 4.5 g of a clear lacquer was added to the obtained paste, and the resultant mixture was intimately kneaded together to form a paint. The obtained paint was applied on a cast-coated paper by using a 150 μm (6 mil) applicator to produce a coating film piece (having a coating film thickness of about 30 μm). The hue of the thus obtained coating film piece was expressed by the L*, a* and b* values as color specification indices thereof which were respectively measured using a multi-spectro-colour-meter "MSC-IS-2D" (manufactured by SUGA SHIKENKI CO., LTD.) according to JIS Z8729.

(7) The tinting strength of the black iron-based particles was measured by the following method. That is, 0.5 g of a sample, 0.5 ml of a castor oil and 1.5 g of titanium dioxide were intimately kneaded together by a Hoover's muller to form a paste. 4.5 g of a clear lacquer was added to the obtained paste, and the resultant mixture was intimately kneaded together to form a paint. The obtained paint was applied on a cast-coated paper by using a 150 μm (6 mil) applicator to produce a coating film piece (having a coating film thickness of about 30 μm). The tinting strength of the thus obtained coating film piece was expressed by the L* value as a color specification index thereof which was measured using a multi-spectro-colour-meter "MSC-IS-2D" (manufactured by SUGA SHIKENKI CO., LTD.) according to JIS Z8729.

(8) The hues of a paint and a resin composition containing the black pigment particles were respectively measured by the following method. That is, the hue of a coating film produced from the paint having the below-mentioned composition and the hue of a resin plate produced from the below-mentioned resin composition were respectively expressed by the L*, a* and b* values as color specification indices thereof which were measured using a multi-spectro-colour-meter "MSC-IS-2D" (manufactured by SUGA SHIKENKI CO., LTD.) according to JIS Z8729.

(9) The dispersibility of the black iron-based particles in a paint vehicle was determined by measuring a gloss of the surface of a coating film produced by the same method as defined in Example 1 below.

(10) The gloss of a coating film produced from the paint containing the black iron-based particles was determined by measuring a 20° gloss thereof using a gloss meter "UGV-5D" (manufactured by SUGA SHIKENKI CO., LTD.). The higher the gloss value, the more excellent the dispersibility of the black iron-based particles in the paint.

(11) The acid resistance of the black iron-based particles was measured by the following method. That is, the paint containing the black pigment particles produced in the below-mentioned Examples was applied onto a cold-rolled steel plate (0.8 mm×70 mm×150 mm; JIS G3141) and then dried to prepare a sample with a coating film having a film thickness of 150 μm and measure the gloss and hue thereof. Next, the thus obtained sample was suspended with a string and immersed in a 5 wt % sulfuric acid aqueous solution filled in a 1000 mL beaker up to about 120 mm in depth, and allowed to stand at 25° C. for 24 hours.

Next, the sample was taken out of the aqueous sulfuric acid solution and slowly washed with water, and then water was shaken off from the sample to measure the gloss and hue of a central portion thereof. From these measured values, the change in gloss (ΔG value) as well as the change in hue (ΔL* value: difference between L* values of the sample) between before and after the immersion in the aqueous sulfuric acid solution were calculated to evaluate an acid resistance thereof. The smaller both of the ΔG value and the ΔL* value, the more excellent the acid resistance of the black iron-based particles.

(12) The dispersibility of the black iron-based particles in a resin composition was evaluated by visually counting the number of undispersed aggregate particles on the surface of a resin plate produced from the resin composition, and classifying the results into the following five ranks. The Rank 5 represents the most excellent dispersing condition.

Rank 5: No undispersed aggregate particles were recognized.

Rank 4: 1 to 4 undispersed aggregate particles per 1 cm$^2$ were recognized;

Rank 3: 5 to 9 undispersed aggregate particles per 1 cm$^2$ were recognized;

Rank 2: 10 to 49 undispersed aggregate particles per 1 cm$^2$ were recognized;

Rank 1: Not less than 50 undispersed aggregate particles per 1 cm$^2$ were recognized.

Example 1

<Production of Black Iron-Based Particles>

To a water suspension containing 10 kg of spherical magnetite particles (average particle size: 0.15 μm; BET specific surface area: 10.8 m$^2$/g) was added an aqueous solution containing 38.9 mol of titanyl sulfate (corresponding to 30% by atom, calculated as Ti, based on whole Fe contained in the magnetite particles). Meanwhile, in order to prevent a pH value of the reaction solution from decreasing upon the addition, NaOH was added to the mixed solution. Next, the temperature and pH value of the mixed solution were adjusted to 75° C. and 6.0, respectively, and the mixed solution was aged for 1 hour to precipitate a titanium oxide hydroxide on the surface of the respective magnetite particles. The thus obtained particles were separated from the solution by filtration, washed with water and then dried, thereby obtaining spherical black magnetic iron oxide particles whose surface was coated with the titanium oxide hydroxide.

10 kg of the thus obtained spherical black magnetic iron oxide particles whose surface was coated with the titanium oxide hydroxide, were calcined under heating at 750° C. for 60 min under a N$_2$ gas flow, and then pulverized, thereby producing black iron-based particles.

The thus obtained black iron-based particles had a titanium element content (A) of 29.9% by atom based on an iron element content contained in the black iron-based particles; a saturation magnetization value σs of 6.5 Am$^2$/kg; and a tinting strength of 39.4. Also, the titanium element content (B) in a portion of the black iron-based particles which was dissolved therefrom at an iron element dissolution percentage of 1% by weight was 43.4% by atom based on an iron element content contained in the portion dissolved, and the ratio of the titanium element content (B) to the titanium element content (A) was 1.45. As the hue of the black iron-based particles, the L* value thereof was 9.1; the a* value thereof was 2.8; and the b* value thereof was 2.6. The black iron-based particles had a phase structure constituted from a mixture of a $FeTiO_3$—$Fe_2O_3$ solid solution and a $Fe_3O_4$-$\gamma$-$Fe_2O_3$ solid solution.

Examples 2 and 3

The same procedure as defined in Example 1 was conducted except that kind of magnetite, amount of the titanium compound added, and heat-calcining temperature were changed variously, thereby obtaining black iron-based particles.

Essential production conditions are shown in Table 1, and various properties of the thus obtained black iron-based particles are shown in Table 2.

Comparative Example 1

<Follow-Up Test of Example 1 of Japanese Patent Application Laid-open (KOKAI) No. 2004-161608>

To a water suspension containing 10 kg of spherical magnetite particles (average particle size: 0.15 µm; BET specific surface area: 10.8 m²/g; FeO content: 25.6% by weight) was added an aqueous solution containing 38.9 mol of titanyl sulfate (corresponding to 30% by atom, calculated as Ti, based on whole Fe contained in the magnetite particles). Meanwhile, in order to prevent a pH value of the reaction solution from decreasing upon the addition, NaOH was added to the mixed solution. Next, the pH value of the mixed solution was adjusted to 8.0 to precipitate a titanium oxide hydroxide on the surface of the respective magnetite particles. The thus obtained particles were separated from the solution by filtration, washed with water and then dried, thereby obtaining spherical black magnetic iron oxide particles whose surface was coated with the titanium oxide hydroxide.

10 kg of the thus obtained spherical black magnetic iron oxide particles whose surface was coated with the titanium oxide hydroxide, were calcined under heating at 750° C. for 60 min under a $N_2$ gas flow, and then pulverized, thereby producing black iron-based particles.

The thus obtained black iron-based particles had a titanium element content (A) of 29.9% by atom based on an iron element content contained in the black iron-based particles; a saturation magnetization value σs of 10.5 Am²/kg; and a tinting strength of 40.4. Also, the titanium element content (B) in a portion of the black iron-based particles which was dissolved at an iron element dissolution percentage of 1% by weight was 21.9% by atom based on an iron element content contained in the portion dissolved, and the ratio of the titanium element content (B) to the titanium element content (A) was 0.73. As the hue of the black iron-based particles, the L* value thereof was 9.7; the a* value thereof was 3.0; and the b* value thereof was 3.1. The black iron-based particles had a phase structure constituted from a mixture of a $FeTiO_3$—$Fe_2O_3$ solid solution and a $Fe_3O_4$-$\gamma$-$Fe_2O_3$ solid solution.

Comparative Example 2

<Follow-Up Test of Example 1 of Japanese Patent Application Laid-open (KOKAI) No. 3-2276 (1991)>

100 g of granular magnetite particles (average particle size: 0.2 µm; magnetization value: 85.0 emu/g) were dispersed and mixed in an aqueous solution containing 0.26 mol of $TiOSO_4$ (corresponding to Ti/Fe=20.0% by atom). Next, NaOH was added to the mixed solution to neutralize the solution and adjust the pH value thereof to 8.0, thereby precipitate a titanium hydroxide on the surface of the respective magnetite particles. The thus obtained particles were separated from the solution by filtration and then dried. As a result of the fluorescent X-ray analysis, it was confirmed that the thus obtained granular magnetite particles whose surface was coated with the titanium hydroxide had a Ti (IV) content of 21.0% by atom based on a total amount of Fe (II) and Fe (III) contained in the particles.

50 g of the thus obtained granular magnetite particles whose surface was coated with the titanium hydroxide, were calcined under heating at 750° C. for 120 min under a $N_2$ gas flow, and then pulverized, thereby producing black particles.

The thus obtained black particles had a titanium element content (A) of 21.0% by atom based on an iron element content contained in the black particles; a saturation magnetization value σs of 0.6 Am²/kg; and a tinting strength of 46.9. Also, the titanium element content (B) in a portion of the black particles which was dissolved therefrom at an iron element dissolution percentage of 1% by weight was 14.3% by atom based on an iron element content contained in the portion dissolved, and the ratio of the titanium element content (B) to the titanium element content (A) was 0.68. As the hue of the black particles, the L* value thereof was 24.5; the a* value thereof was 0.8; and the b* value thereof was 0.6. The black particles had a phase structure constituted from a mixture of a $Fe_2O_3$—$FeTiO_3$ solid solution and $Fe_2TiO_5$.

Comparative Example 3

<Follow-Up Test of Example 1 of Japanese Patent Application Laid-open (KOKAI) No. 2002-129063>

A slurry containing titanium oxide hydroxide having a specific surface area of 260 m²/g which was produced by a sulfate method, was adjusted to a concentration of 150 g/L, calculated as titanium oxide, and then neutralized with a 400 g/L sodium hydroxide solution to adjust a pH value thereof to 9. After stirring for 2 hours, the pH value of the resultant slurry was adjusted to 6 by adding a 200 g/L hydrochloric acid solution thereto. Then, the resultant particles were separated and washed by filtration. The thus washed titanium oxide hydroxide was repulped to adjust a concentration thereof in the obtained slurry to 100 g/L, calculated as titanium oxide. Thereafter, a ferric chloride solution having a concentration of 100 g/L, calculated as $Fe_2O_3$, was added to the slurry in an amount of one part by weight based on one part of the titanium oxide, and then a 200 g/L sodium hydroxide solution was dropped thereinto to adjust a pH value of the slurry to 7, thereby coating the surface of the titanium oxide hydroxide with iron hydroxide.

After stirring for 1 hour, the thus obtained particles were separated from the slurry by filtration, washed and then dried at 110° C. The obtained dried product was placed in a porcelain crucible, and calcined in an electric furnace at 900° C. for 1 hour, thereby synthesizing titanium oxide having a $Fe_2TiO_5$ phase. After cooling, the thus obtained titanium oxide having a $Fe_2TiO_5$ phase was reduced with a mixed gas composed of a hydrogen gas and carbon dioxide at 500° C. for 5 hours, thereby obtaining black particles.

The thus obtained black particles had a titanium element content (A) of 98.7% by atom based on an iron element content contained in the black particles; a saturation magnetization value σs of 6.5 Am²/kg; and a tinting strength of 51.2. Also, the titanium element content (B) in a portion of the black particles which was dissolved therefrom at an iron element dissolution percentage of 1% by weight, was 39.8% by atom based on an iron element content contained in the portion dissolved, and the ratio of the titanium element content (B) to the titanium element content (A) was 0.40. As the hue of the black particles, the L* value thereof was 21.5; the a* value thereof was 0.8; and the b* value thereof was 4.3. The black particles had a phase structure constituted from a mixture of a $Fe_2O_3$—$FeTiO_3$ solid solution and $Fe_2TiO_5$.

Essential production conditions are shown in Table 1, and various properties of the thus obtained black iron-based particles are shown in Table 2.

Example 4

<Production of Black Paint>

10 g of the black iron-based particles produced in Example 1, were blended with the following components at the weight ratio shown below, and charged into a 140 mL glass bottle together with 90 g of 3 mmϕ glass beads. Next, the obtained mixture was mixed and dispersed for 90 min by a paint shaker, thereby preparing a mill base.

The resultant paint composition was as follows.

Composition of Mill Base:

| | |
|---|---|
| Black iron-based particles | 12.2 parts by weight |
| Amino alkyd resin (AMILAC No. 1026, produced by KANSAI PAINT CO., LTD.) | 19.5 parts by weight |
| Thinner | 7.3 parts by weight |

The above prepared mill base was blended with the following components at the weight ratio shown below, and the obtained mixture was further mixed and dispersed for 15 min by a paint shaker, thereby obtaining a paint containing the black iron-based particles.

The resultant paint composition was as follows

Composition of Paint:

| | |
|---|---|
| Mill base | 39.0 parts by weight |
| Amino alkyd resin (AMILAC No. 1026, produced by KANSAI PAINT CO., LTD.) | 61.0 parts by weight |

Next, the thus obtained paint was applied onto a cold-rolled steel plate (0.8 mm×70 mm×150 mm; JIS G-3141) and dried to form a coating film having a thickness of 150 μm.

The obtained coating film had a gloss of 95%. As to the hue of the coating film, the L* value thereof was 9.0; the a* value thereof was 2.8; and the b* value thereof was 2.7. As a result of subjecting the coating film to acid resistance test, it was confirmed that the change in gloss (ΔG value) thereof was 2%, and the change in lightness (ΔL* value) thereof was 0.3.

Examples 5 and 6 and Comparative Examples 4 to 6

The same procedure as defined in Example 4 was conducted except that kind of black iron-based particles was changed variously, thereby obtaining a black paint.

Essential treatment conditions and various properties of the thus obtained black paints are shown in Table 3.

Example 7

<Production of Resin Composition>

1.5 g of the black iron-based particles obtained in Example 1, and 48.5 g of polyvinyl chloride resin particles 103EP8D (produced by NIPPON ZEON CO., LTD.) were weighed and charged into a 100 cc polybeaker, and intimately mixed with each other by a spatula, thereby obtaining mixed particles.

0.5 g of calcium stearate was added to the obtained mixed particles. The obtained mixed particles were intimately mixed and then slowly supplied to hot rolls heated to 160° C. whose clearance was set to 0.2 mm, and continuously kneaded therebetween until a uniform resin composition was produced. Thereafter, the kneaded resin composition was separated from the hot rolls and used as a raw material for forming a colored resin plate.

Next, the thus obtained resin composition was sandwiched between a pair of surface-polished stainless steel plates, placed within a hot press heated to 180° C. and then subjected to a pressure molding while applying a pressure of 1 ton/cm² thereto, thereby obtaining a colored resin plate having a thickness of 1 mm.

The black iron-based particles contained in the thus obtained colored resin plate had a dispersing condition of Rank 5.

Examples 8 and 9 and Comparative Examples 7 to 9

The same procedure as defined in Example 7 was conducted except that kind of black iron-based particles were changed variously, thereby obtaining a resin composition.

Essential treatment conditions and various properties of the obtained resin compositions are shown in Table 4.

The black iron-based particles of the present invention are not only excellent in dispersibility, acid resistance, tinting strength and blackness but also exhibit a less magnetization value, and therefore, can be suitably used as a pigment and a paint exhibiting a black color, a coloring material for resin compositions, a filler, etc.

TABLE 1

| | Properties of magnetite particles | | |
|---|---|---|---|
| Examples and Comparative Examples | Kind | Average particle diameter (μm) | BET specific surface area (m²/g) |
| Example 1 | Spherical magnetite | 0.15 | 10.8 |
| Example 2 | Spherical magnetite | 0.06 | 20.8 |
| Example 3 | Octahedral magnetite | 0.17 | 8.1 |
| Comparative Example 1* | Spherical magnetite | 0.15 | 10.8 |
| Comparative Example 2** | Granular magnetite | 0.20 | 10.8 |
| Comparative Example 3*** | — | — | — |

| | Coating treatment with Ti compound | | |
|---|---|---|---|
| Examples and Comparative Examples | Kind | Ti/whole Fe (% by atom) | Aging temperature |
| Example 1 | $TiOSO_4$ | 30 | 75 |
| Example 2 | $TiOSO_4$ | 25 | 75 |
| Example 3 | $TiOSO_4$ | 15 | 75 |
| Comparative Example 1* | $TiOSO_4$ | 30 | — |
| Comparative Example 2** | $TiCl_4$ | 20 | — |
| Comparative Example 3*** | — | — | — |

TABLE 1-continued

| Examples and Comparative Examples | Coating treatment with Ti compound | | Heat treatment | |
|---|---|---|---|---|
| | Aging pH value | Aging time (min) | Temperature (° C.) | Time (min) |
| Example 1 | 6.0 | 60 | 750 | 60 |
| Example 2 | 7.0 | 60 | 770 | 60 |
| Example 3 | 6.0 | 60 | 770 | 60 |
| Comparative Example 1* | — | — | 750 | 60 |
| Comparative Example 2** | — | — | 750 | 120 |
| Comparative Example 3*** | — | — | — | — |

Note:
*Example 1 of Japanese Patent Application Laid-open (KOKAI) No. 2004-161608
**Example 1 of Japanese Patent Application Laid-open (KOKAI) No. 3-2276(1991)
***Example 1 of Japanese Patent Application Laid-open (KOKAI) No. 2002-129063

TABLE 2

Properties of black iron-based particles

| Examples and Comparative Examples | Ti/Fe (A) (% by atom) | Ti/Fe (B) (% by atom) | (B)/(A) | Saturation magnetization value σs (Am2/kg) |
|---|---|---|---|---|
| Example 1 | 29.9 | 43.4 | 1.45 | 6.5 |
| Example 2 | 25.1 | 35.1 | 1.40 | 0.8 |
| Example 3 | 15.1 | 22.8 | 1.51 | 26.8 |
| Comparative Example 1* | 29.9 | 21.9 | 0.73 | 10.5 |
| Comparative Example 2** | 21.0 | 14.3 | 0.68 | 0.6 |
| Comparative Example 3*** | 98.7 | 39.8 | 0.40 | 6.5 |

Properties of black iron-based particles

| Examples and Comparative Examples | Tinting strength (L*) | Hue | | |
|---|---|---|---|---|
| | | L* | a* | b* |
| Example 1 | 39.4 | 9.1 | 2.8 | 2.6 |
| Example 2 | 38.8 | 10.8 | 3.0 | 3.6 |
| Example 3 | 39.5 | 8.8 | 2.1 | 1.7 |
| Comparative Example 1* | 40.4 | 9.7 | 3.0 | 3.1 |
| Comparative Example 2** | 46.9 | 24.5 | 0.8 | 0.6 |
| Comparative Example 3*** | 51.2 | 21.5 | 0.8 | 4.6 |

Properties of black iron-based particles

| Examples and Comparative Examples | BET specific surface area (m$^2$/g) | Composition |
|---|---|---|
| Example 1 | 8.1 | $Fe_2O_3$—$FeTiO_3$ + $Fe_3O_4$-γ-$Fe_2O_3$ |
| Example 2 | 17.2 | $Fe_2O_3$—$FeTiO_3$ |
| Example 3 | 6.2 | $Fe_2O_3$—$FeTiO_3$ + $Fe_3O_4$-γ-$Fe_2O_3$ |
| Comparative Example 1* | 9.0 | $Fe_2O_3$—$FeTiO_3$ + $Fe_3O_4$-γ-$Fe_2O_3$ |
| Comparative Example 2** | 5.8 | $Fe_2O_3$—$FeTiO_3$ + $Fe_2TiO_5$ |
| Comparative Example 3*** | 6.7 | $TiO_2$ + $FeTiO_4$ + $Fe_2OTiO_5$ |

Note:
*Example 1 of Japanese Patent Application Laid-open (KOKAI) No. 2004-161608
**Example 1 of Japanese Patent Application Laid-open (KOKAI) No. 3-2276(1991)
***Example 1 of Japanese Patent Application Laid-open (KOKAI) No. 2002-129063

TABLE 3

| Examples and Comparative Examples | Black iron-based particles used | Properties of coating film | | | |
|---|---|---|---|---|---|
| | | Gloss (%) | Hue | | |
| | | | L* (—) | a* (—) | b* (—) |
| Example 4 | Example 1 | 95 | 9.0 | 2.8 | 2.7 |
| Example 5 | Example 2 | 89 | 10.6 | 3.0 | 3.6 |
| Example 6 | Example 3 | 97 | 8.8 | 2.1 | 1.8 |
| Comparative Example 4 | Comparative Example 1 | 74 | 9.9 | 3.0 | 3.0 |
| Comparative Example 5 | Comparative Example 2 | 68 | 24.8 | 0.8 | 0.7 |
| Comparative Example 6 | Comparative Example 3 | 60 | 22.0 | 0.9 | 4.5 |

| Examples and Comparative Examples | Properties of coating film Acid resistance | |
|---|---|---|
| | ΔG (%) | ΔL (—) |
| Example 4 | 2 | 0.3 |
| Example 5 | 1 | 0.2 |
| Example 6 | 4 | 0.3 |
| Comparative Example 4 | 11 | 1.5 |
| Comparative Example 5 | 9 | 1.3 |
| Comparative Example 6 | 19 | 4.1 |

TABLE 4

| Examples and Comparative Examples | Black iron-based particles used | Properties of resin composition | | | |
|---|---|---|---|---|---|
| | | Dispersing condition (—) | Hue | | |
| | | | L* (—) | a* (—) | b* (—) |
| Example 7 | Example 1 | 5 | 9.3 | 2.9 | 2.7 |
| Example 8 | Example 2 | 4 | 10.8 | 3.1 | 3.6 |
| Example 9 | Example 3 | 5 | 8.9 | 2.2 | 1.8 |
| Comparative Example 7 | Comparative Example 1 | 2 | 10.1 | 3.0 | 3.1 |
| Comparative Example 8 | Comparative Example 2 | 2 | 25.0 | 0.8 | 0.6 |
| Comparative Example 9 | Comparative Example 3 | 1 | 22.4 | 0.7 | 4.4 |

What is claimed is:

1. Black iron-based particles comprising composite oxide particles consisting of iron, titanium and oxygen and having a blackness L* value of 6 to 12.5 and a titanium element content (A) of 5 to 35% by atom based on an iron element content contained in the black iron-based particles, and a ratio of a titanium element content (B) (based on an iron element content contained in the portion dissolved) in a portion of the black iron-based particles, which is dissolved therefrom at an iron element dissolution percentage of 1% by weight, to the titanium content (A) of not less than 1.0.

2. Black iron-based particles according to claim 1, wherein the titanium element content (A) based on an iron element content contained in the black iron-based particles is 5 to 35% by atom, and the ratio of the titanium element content (B) (based on an iron element content contained in the portion dissolved) in a portion of the black iron-based particles, which is dissolved at an iron element dissolution percentage of 1% by weight, to the titanium content (A), is not less than 1.2.

3. Black iron-based particles according to claim 1, wherein the titanium element content (A) based on an iron element content contained in the black iron-based particles is 10 to 33.3% by atom, and the ratio of the titanium element content (B) (based on an iron element content contained in the portion dissolved) in a portion of the black iron-based particles, which is dissolved at an iron element dissolution percentage of 1% by weight, to the titanium content (A), is not less than 1.2.

4. Black iron-based particles according to claim 1, wherein the iron/titanium composite oxide particles have a phase structure constituted from at least one selected from the group consisting of a $FeTiO_3$—$Fe_2O_3$ solid solution, $Fe_2TiO_5$, a $Fe_2TiO_4$—$Fe_3O_4$ solid solution, $FeTiO_3$ and $Fe_2TiO_4$.

5. Black iron-based particles according to claim 1, wherein the iron/titanium composite oxide particles have a phase structure constituted from at least a $FeTiO_3$—$Fe_2O_3$ solid solution.

6. Black iron-based particles according to claim 1, wherein the black iron-based particles have a saturation magnetization value of less than 40 $Am^2/kg$.

7. Black iron-based particles according to claim 1, wherein the black iron-based particles have a specific surface area value of 3 to 60 $m^2/g$ as measured by nitrogen absorption method, an a* value of −2 to 4, a b* value of −2 to 4 and a tinting strength of 35 to 44.

8. A black paint comprising a paint base material and the black iron-based particles as defined in claim 1 which are blended in the paint base material.

9. A black paint according to claim 8, wherein a coating film obtained from the black paint has an L* value of 6 to 12.5, an a* value of −2 to 4 and a b* value of −2 to 4.

10. A rubber or resin composition comprising a rubber or resin composition base material and the black iron-based particles as defined in claim 1 which are blended in the rubber or resin composition base material.

11. A rubber or resin composition according to claim 10, wherein the composition has an L* value of 6 to 12.5, an a* value of −2 to 4 and a b* value of −2 to 4.

* * * * *